(12) United States Patent
Chevrette

(10) Patent No.: US 7,641,200 B2
(45) Date of Patent: Jan. 5, 2010

(54) VARIABLE CLEARANCE PACKING RING ARRANGEMENT

(75) Inventor: Richard Jon Chevrette, Troy, NY (US)

(73) Assignee: General Electric Company, Schenectady, NY (US)

( * ) Notice: Subject to any disclaimer, the term of this patent is extended or adjusted under 35 U.S.C. 154(b) by 142 days.

(21) Appl. No.: 11/287,727

(22) Filed: Nov. 28, 2005

(65) Prior Publication Data

US 2007/0132192 A1 Jun. 14, 2007

(51) Int. Cl.
*F16J 15/447* (2006.01)
*F16J 15/00* (2006.01)

(52) U.S. Cl. .................... 277/303; 277/413; 277/421; 277/545; 277/578

(58) Field of Classification Search ......... 277/411–413, 277/416, 421, 545, 578, 303; 415/174.5, 415/173.5, 229–230, 170.1, 174.2, 173.1
See application file for complete search history.

(56) References Cited

U.S. PATENT DOCUMENTS

| | | | | |
|---|---|---|---|---|
| 969,517 | A | * | 9/1910 | Boyd ........................ 277/411 |
| 2,279,814 | A | * | 4/1942 | Dickinson .................. 277/416 |
| 3,768,817 | A | * | 10/1973 | Daniels ..................... 277/632 |
| 4,436,311 | A | | 3/1984 | Brandon |
| 5,002,288 | A | * | 3/1991 | Morrison et al. ........... 277/413 |
| 5,395,124 | A | | 3/1995 | Brandon |
| 5,464,226 | A | | 11/1995 | Dalton |
| 5,603,510 | A | | 2/1997 | Sanders |
| 5,709,388 | A | | 1/1998 | Skinner et al. |
| 5,810,365 | A | | 9/1998 | Brandon et al. |
| 5,934,684 | A | * | 8/1999 | Brandon et al. ............ 277/421 |
| 5,971,400 | A | | 10/1999 | Turnquist et al. |
| 5,975,532 | A | * | 11/1999 | Karttunen et al. .......... 277/300 |
| 6,022,027 | A | | 2/2000 | Chevrette et al. |
| 6,065,754 | A | | 5/2000 | Cromer et al. |
| 6,139,018 | A | | 10/2000 | Cromer et al. |
| 6,318,728 | B1 | | 11/2001 | Addis et al. |
| 6,502,823 | B1 | | 1/2003 | Turnquist et al. |
| 6,572,114 | B1 | | 6/2003 | Magoshi et al. |
| 6,651,986 | B2 | | 11/2003 | Chevrette et al. |
| 6,655,696 | B1 | * | 12/2003 | Fang et al. ................. 277/409 |
| 6,695,316 | B2 | | 2/2004 | Popa et al. |
| 6,715,766 | B2 | | 4/2004 | Kirby, III et al. |
| 6,786,487 | B2 | | 9/2004 | Dinc et al. |
| 6,935,634 | B2 | | 8/2005 | Zuo et al. |
| 7,052,017 | B2 | * | 5/2006 | Uchida et al. .............. 277/420 |
| 7,066,470 | B2 | * | 6/2006 | Turnquist et al. .......... 277/413 |
| 7,226,053 | B2 | * | 6/2007 | Nakano et al. ............. 277/355 |
| 2004/0188947 | A1 | * | 9/2004 | Paprotna .................... 277/413 |

FOREIGN PATENT DOCUMENTS

WO 9416250 A 7/1994
WO 2005031197 A 4/2005

* cited by examiner

*Primary Examiner*—Vishal Patel
(74) *Attorney, Agent, or Firm*—Cantor Colburn LLP

(57) ABSTRACT

Disclosed is a variable clearance packing ring arrangement including a packing ring, wherein the packing ring includes a sealing face. The variable clearance packing ring arrangement also includes an actuating arrangement internal to the packing ring.

13 Claims, 3 Drawing Sheets

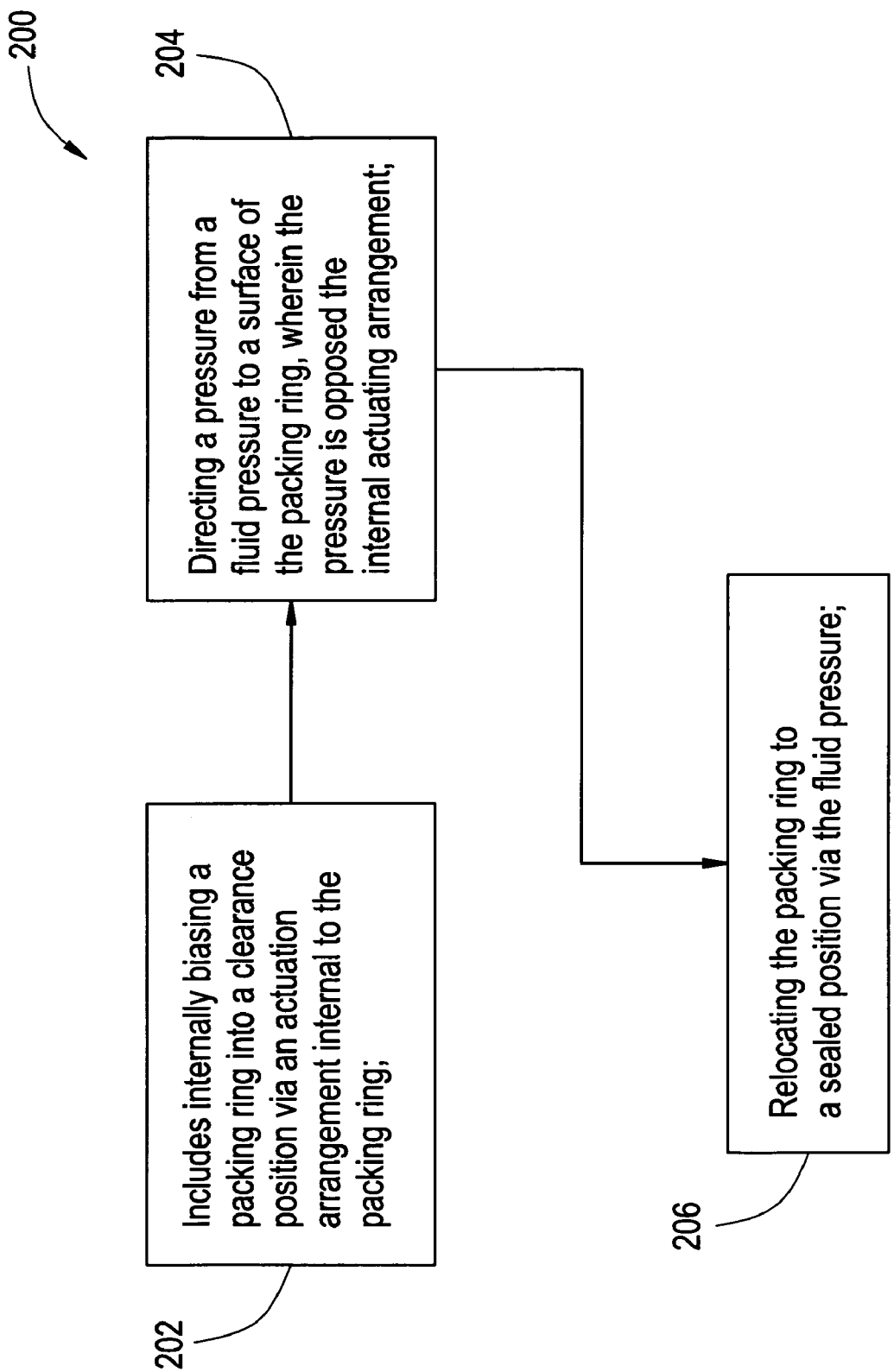

VARIABLE CLEARANCE PACKING RING ARRANGEMENT

FIELD OF THE INVENTION

This disclosure relates generally to packing rings used in rotary machines, and more particularly to variable clearance, positive pressure packing rings used in rotary machines such as steam turbines.

BACKGROUND OF THE INVENTION

In rotary machines such as steam turbines, seals are provided between rotating and stationary components. For example, in steam turbines, it is customary to employ a plurality of arcuate packing ring segments (bearing labyrinthian features) to form a labyrinth seal about and between stationary and rotating components. Typically, the arcuate packing ring segments are disposed in an annular groove in the stationary component concentric about the axis of rotation of the machine, and hence concentric to the sealing surface of the rotating component. The sealing function is achieved by creating turbulent flow of a working media, for example, steam, as it passes through the relatively tight clearances within the labyrinth defined by the seal face teeth and the opposing surface of the rotating component.

In order to avoid damage to the rotor and packing ring during transient conditions such as startup and shutdown, positive pressure, variable clearance packing rings are sometimes used. In positive pressure, variable clearance packing rings, the packing ring segments are typically spring biased into outer or large clearance positions causing the seal faces carried by the packing ring to be spaced substantially outwardly of the rotary component. After start-up, the working fluid medium, e.g., steam, is inlet to the grooves of the stationary component, urging the segments for move inwardly against the bias of the springs, toward the inner or small clearance positions. These springs are typically located within the annular groove defined by the stationary component, and are sized relative to the annular grooves in which they reside. In large turbine units, the annular groove is typically large enough to accommodate large springs having an elasticity capable of tolerating the pressure-force resulting from inlet of the fluid medium. In addition, the packing ring is typically large enough to allow springs to be affixed to the portion of the packing ring residing in the annular groove.

However, when working with smaller turbine units used in applications such as boiler feed pumps, reactor feed pumps, mechanical drives for compressors and pumps, and some generator drive units, it can become difficult and impractical to install capable springs within the narrow width/diameter annular grooves present in the smaller turbine unit. Thus, in these instances, there is a need for a springing device that can be used in conjunction with annular grooves having too small a width and diameter to accommodate conventional springs.

BRIEF DESCRIPTION OF THE INVENTION

Disclosed is a variable clearance packing ring arrangement including a packing ring, wherein the packing ring includes a sealing face. The variable clearance packing ring arrangement also includes an actuating arrangement internal to the packing ring.

Also disclosed is a method for sealing a variable clearance packing ring arrangement, including internally biasing a packing ring into a clearance position via an actuating arrangement internal to the packing ring, directing a fluid pressure to a surface of the packing ring, wherein the pressure is opposed to the internal actuating arrangement, and relocating the packing ring to a sealed position via the pressure from the fluid medium.

BRIEF DESCRIPTION OF THE DRAWINGS

The foregoing and other features and advantages of the present invention should be more fully understood from the following detailed description of illustrative embodiments taken in conjuncture with the accompanying Figures in which like elements are numbered alike in the several Figures:

FIG. 4 is a block diagram illustrating a method for sealing a variable clearance packing ring arrangement in accordance with the present disclosure.

DETAILED DESCRIPTION OF THE INVENTION

Figure 1:
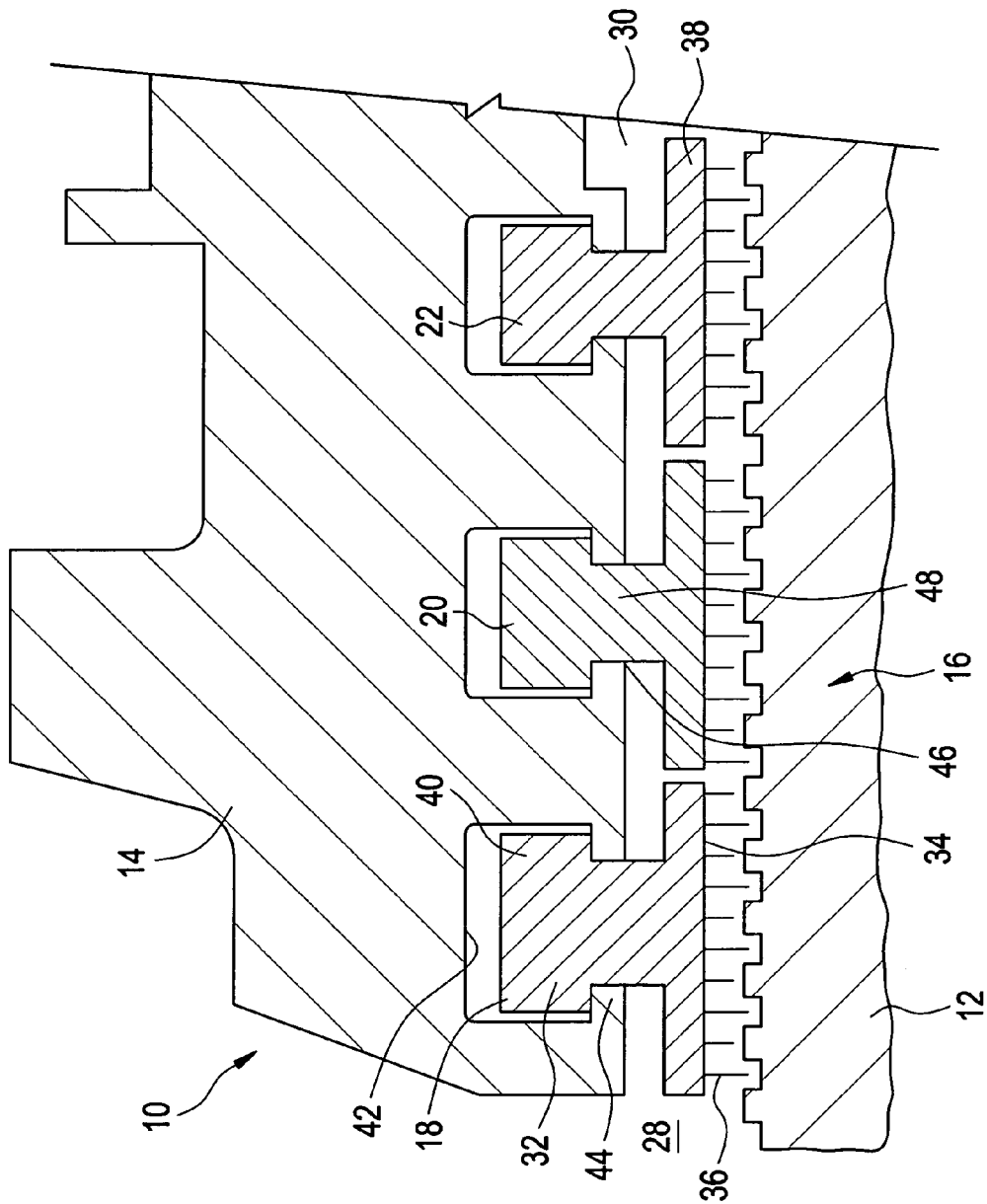
FIG. 1 is a fragmentary cross-sectional view of a portion of a steam turbine looking transversely of the axis thereof and illustrating a known labyrinth seal arrangement.

Referring to FIG. 1 (prior art), there is illustrated a portion of a rotary machine, for example, a steam turbine, generally designated 10, having a rotary component 12 at least partially disposed in a stationary component 14, wherein the rotary component 12 is supported for rotation by conventional means, not shown, within the stationary component 14. A multi-stage labyrinth seal 16, including a plurality of packing rings 18, 20 and 22, is disposed about the rotary component 12, separating high and low pressure regions 28 and 30, respectively. Each packing ring is formed of an annular array of arcuate packing ring segments 32. Each packing ring segment 32 has a sealing face 34 with projecting radial teeth 36 acting as partial barriers to steam flowing from the high 28 to low 30 pressure regions.

The stationary component 14, which was briefly mentioned above, has a generally dovetail-shaped annular groove 42. The annular groove 42 is located along the radially innermost portions of the stationary component 14, defined by a pair of locating flanges 44 which extend axially toward one another defining a slot 46 therebetween. A neck 48 of each segment 32 interconnects the locating flanges or hooks 40 with the sealing face 34, and extends through the slot 46.

It will be appreciated that the segments 32 may comprise positive pressure, variable clearance packing ring segments which are movable between large clearance positions, and sealed, small clearance positions in relation to the rotary component 12. In a typical variable clearance packing ring, an actuating arrangement, such as a spring, may reside between locating flange 44 of the stationary component 14, and hooks 40 of packing rings 18, 20, and 22. However, in some applications, such as boiler feed pumps, reactor feed pumps, mechanical drives for compressors and pumps, and some generator drive units, the annular groove 42 may not be of adequate dimensions to accommodate the actuating arrangement. In applications such as these, the actuating arrangement must be disposed in an area other than the annular groove 42, such as the packing ring segment itself. Inclusion of the actuating arrangement within the packing ring segment is thus the subject of the present invention, and will be discussed herein below.

Figure 2:
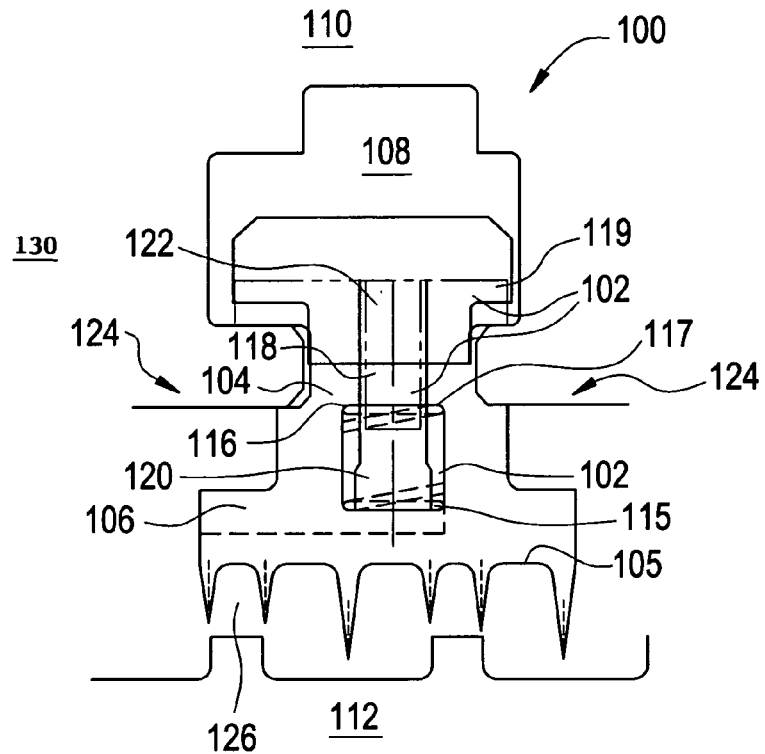
FIG. 2 is a cross-sectional view of a variable clearance packing ring arrangement in accordance with the present disclosure.
Figure 3:
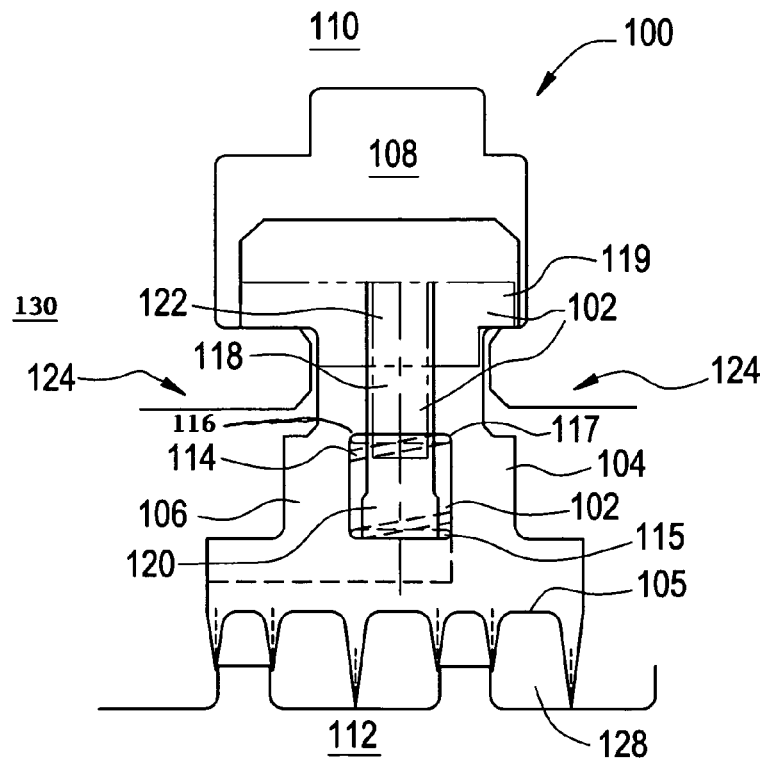
FIG. 3 is a cross-sectional view of the variable clearance packing ring arrangement in accordance with the present disclosure.

Referring to FIGS. 2 and 3, an embodiment 100 of a variable clearance packing ring arrangement is illustrated and includes a packing ring 104, wherein the packing ring 104 includes a sealing face 105. The end of the packing ring 104 opposite the sealing face 105 is illustrated to be disposed within an annular groove 108 defined by a stationary component 110. In addition, the packing ring 104 and the stationary component 110, which includes at least one flange 124, are included within a rotary machine, such as a steam turbine (a relevant portion of which being illustrated), which also includes a rotary component 112.

Included internally to the packing ring 104 is an actuating arrangement 102. The actuating arrangement 102 includes at least one actuator component 114, at least one connecting component 118, and at least one impeding component 119. These three components reside within the packing ring 104, and provide a means for packing ring 104 movement between a clearance position and a sealed position.

The actuating component 102 is formed or manufactured such that the connecting component 118 securely associates the actuator component 114 and the impeding component 119. The connecting component 118 includes an impeding end 122, at which the connecting component 118 and impeding component 119 are securely associated to form a rigid "T" structure. The connecting component 118 comprises the vertical portion of the "T" (as shown in the figures), while the impeding component 119 comprises the horizontal portion of the "T" (as shown in the figures), wherein the impeding structure 119 lies consistently adjacent to the at least one flange 124 included in the stationary component 110.

At the opposite end to its connection with the impeding component 119, the connecting component 118 is also securely associated with the actuator component 114. The connecting component 118 includes an actuator end 120 and the actuator component 114 includes a fixed end 115, wherein the connecting component 118 and actuator component 114 are associated with each other at these ends respectively.

Opposite its fixed end 115, the actuator component 114 of the actuating arrangement 102 also includes an extending end 116 that is positioned to be at a greater distance from the rotary component 112 than is the fixed end 115. The extending end 116 is extendable and compressible, and is associated with the packing ring 104 in which it resides via an association 117. It is at the association 117 that the extending end 116 of the actuator component 114 associates the entire actuating arrangement 102 with the packing ring 104.

The association 117 between the actuator component 114 and packing ring 104 may be accomplished via any means necessary to the desired end purpose. One such means involves the actuating arrangement 102 and packing ring 104 being of a single unitary structure, created or formed as a singular continuous unit joined at the association 117.

Another means of achieving the association 117 involves the actuating arrangement 102 being separate to the packing ring 104, wherein the actuating arrangement is inserted into a packing ring cavity 106 defined by the packing ring 104. The actuating arrangement 102 may then reside within the packing ring cavity 106 in a permanent (affixed so as to be non-removable without causing damage to the components) or removable (capable of disassembly without causing damage to the components) association 117 with the packing ring 104. This association 117 between the actuator component 114 and packing ring 104 may be accomplished via any removable affixing method, including but not limited to interlocking flanges, hooking structures, and frictional forces, and any permanent affixing method including but not limited to adhering via a heat/chemical process.

While the actuator component 114 is directly associated with the packing ring 104 via the association 117 described above, neither the connecting component 118 or impeding component 119 (i.e. the "T" structure components) includes a direct association with the packing ring 104. Instead, the extendable and compressible actuator component 114 (extending and compressing being at the extending end 116) indirectly associates the connecting component 118, and thus the impeding component 119, with the packing ring 104. Therefore, because there is no direct association between the "T" structure and packing ring 104, the packing ring 104 may move between the clearance position and sealed position independently of the "T" structure. More specifically, while the extending end 116 of the actuator component 114 extends and compresses in conjunction with packing ring 104 movement between these two positions, the connecting component 118 and impeding component 119 (i.e. the "T" structure) may remain stationary. This movement of the packing ring 104 between the clearance position and sealed position will be discussed in detail herein below.

Referring to FIG. 2, the packing ring 104 is illustrated in the clearance (open) position, which allows a large clearance gap 126 between the rotary component 112 and seal face 105 of the packing ring 104 when the rotary machine is in a transient condition. The clearance position is achieved via the actuator component 114, which urges the packing ring 104 into the clearance position via a radial force applied to the association 117 between the actuator component 114 and packing ring 104. This radial force biases the packing ring 104 away from the rotary component 112, holding the packing ring 104 in the clearance position for the duration of any transient condition within the rotary machine. However, while the packing ring 104 is biased into and then held within the clearance position, the "T" structure, because of its ability to move independently of the packing ring 104, remains stationary and adjacent to flange 124.

Referring again to FIGS. 2 and 3, the packing ring 104 moves from the clearance position to the sealed position, wherein the sealed position allows a small clearance gap 128 between the rotary component 112 and labyrinth teeth of the seal face 105 of the packing ring 104. The packing ring 104 is moved into the sealed position when, during operation of the rotary machine, a fluid medium such as steam is inlet into the annular groove 108 of the stationary component 110 from a high pressure source 130. Fluid medium inlet into the annular groove 108 builds a pressure upon the end of the packing ring 104 opposite the seal face 105, and this pressure inwardly biases the packing ring 104 against the bias of the actuator component 114, moving the packing ring 104 towards the rotary component 112, and reducing the clearance gap 128 until a seal with the rotary component 112 is ultimately formed.

However the "T" structure, again because of its ability to move independently of the packing ring 104, remains stationary in response to the inward bias from the fluid medium pressure because the impeding component 119 (again, horizontal component of the "T" structure) is adjacent to the flange 124, and this adjacency prevents or impedes inward movement. In turn, the fixed end 115 of the actuator component 114, which is associated with the actuator end 120 of the connecting component 118 (the vertical portion of the "T" structure), is also impeded from inward movement. However, since the extending end 116 of the actuator component 114 is directly associated with the packing ring 104, the extending end 116 of the actuator component 114 will move inwardly toward the rotary component 112 along with the packing ring 104. Also, since the fixed end 115 of the actuator component 114 remains stationary in its association with the impeded "T" structure, the extending end 116 of the actuator component 114 will be compressed inwardly toward the rotary component 112 and fixed end 115 of the actuator component 114, thus compressing the structure of the actuator component 114 as a whole.

When rotary machine operation is concluded, the rotary machine may return to a transient position, cutting off fluid medium inlet to the annular groove 108. Once the pressure from the fluid medium dissipates, the actuator component 114 may again bias the packing ring 104 into the clearance position, holding it there until machine operation begins again.

It should be appreciated that the actuator component 114 may be any actuating device, mechanism, or structure such as but not limited to at least one spring loaded bar, at least one cam, at least one hydraulic cylinder, at least one pneumatic device, at least one piezoelectric device, and at least one sinusoidal spring. It should also be appreciated that there may be included a blocking structure within the packing ring cavity 106, annular cavity 108, and/or clearance gap 126, 128 which may block and stop the inward movement of the packing ring 104 from moving further inward than may be desired. It should further be appreciated that as many actuation assemblies 102 as desired may be installed or manufactured within the packing rings 104 of the multiple variable clearance packing ring arrangement 100 segments within a rotary machine.

Referring to FIG. 4, a method 200 for sealing a variable clearance packing ring arrangement 100 is illustrated and includes internally biasing a packing ring 104 into a clearance position via an actuation arrangement 102 internal to the packing ring 104 as shown in Operational Block 202. The method also includes directing a pressure from a fluid pressure to a surface of the packing ring 104, wherein the pressure is opposed the internal actuating arrangement 102, as shown in Operational Block 204, and relocating the packing ring 104 to a sealed position via the fluid pressure, as shown in Operational Block 206.

It should be appreciated that the method 200 may also include the actuating arrangement 102 holding the packing ring 104 in the clearance position during transient conditions of the rotary machine. The packing ring 104 may additionally be relocated to the sealing position during operating conditions of the rotary machine.

While the invention has been described with reference to an exemplary embodiment, it should be understood by those skilled in the art that various changes may be made and equivalents may be substituted for elements thereof without departing from the scope of the invention. In addition, many modifications may be made to adapt a particular situation or substance to the teachings of the invention without departing from the scope thereof. Therefore, it is important that the invention not be limited to the particular embodiment disclosed as the best mode contemplated for carrying out this invention, but that the invention will include all embodiments falling within the scope of the apportioned claims. Moreover, unless specifically stated any use of the terms first, second, etc. do not denote any order or importance, but rather the terms first, second, etc. are used to distinguish one element from another.

What is claimed is:

1. A method for sealing a variable clearance packing ring arrangement, the method comprising:

internally biasing a packing ring into a clearance position via an actuating arrangement partially disposed in an internal cavity defined by said packing ring, said actuating arrangement including a connecting component having a first end connected to an impeding component disposed adjacent to a flange of a stationary component, and a biasing component disposed concentrically on said connecting component, wherein said biasing component includes a first end and a second end, said first end being affixed to said packing ring and said second end being affixed to a distal end of said connecting component;

directing a fluid pressure to a surface of said packing ring, wherein said pressure is opposed to said internal actuating arrangement; and relocating said packing ring to a sealed position via said pressure from said fluid medium.

2. A method for sealing a variable clearance packing ring arrangement according to claim 1, further including holding said packing ring in said clearance position during transient conditions of a rotary machine.

3. A method for sealing a variable clearance packing ring arrangement according to claim 1, further relocating said packing ring into a sealed position during operating conditions of a rotary machine.

4. A method for sealing a variable clearance packing ring arrangement according to claim 1, wherein said biasing component is a spring.

5. A variable clearance packing ring arrangement comprising:

a stationary component having at least one flange;
   a packing ring including a sealing face; and
   an actuating arrangement partially disposed in an internal cavity defined by said packing ring, said actuating arrangement including a connecting component having a first end connected to an impeding component and at least one biasing component disposed concentrically on said connecting component, wherein said impeding component is adjacent to said flange,
   wherein said biasing component includes a first end and a second end, said first end being affixed to said packing ring and said second end being affixed to a distal end of said connecting component.

6. A variable clearance packing ring arrangement according to claim 5, wherein said actuating arrangement and said packing ring are of a single unitary structure.

7. A variable clearance packing ring arrangement according to claim 5, wherein said actuating arrangement is inserted into said internal cavity and resides in permanent association with said packing ring within said packing ring cavity.

8. A variable clearance packing ring arrangement according to claim 5, wherein said actuating arrangement is inserted into said internal cavity and resides in removable association with said packing ring within said packing ring cavity.

9. A variable clearance packing ring arrangement according to claim 5, wherein said at least one biasing component is at least one of at least one spring loaded bar, at least one cam, at least one hydraulic cylinder, at least one pneumatic device, at least one piezoelectric device, and at least one sinusoidal spring.

10. A variable clearance packing ring arrangement according to claim 5, wherein said packing ring moves between a clearance position and a sealed position in relation to a rotary component.

11. A variable clearance packing ring arrangement according to claim 10, wherein said packing ring is held in said clearance during transient conditions of a rotor machine, and herein said packing ring is in said sealed position during operating conditions of said rotor machine.

12. A variable clearance packing ring arrangement according to claim 10, wherein said packing ring forms a seal with said rotary component when in said sealed position.

13. A variable clearance packing ring arrangement according to claim 5, wherein said biasing component is a spring.

* * * * *